US010564249B2

(12) United States Patent
Djerafi et al.

(10) Patent No.: US 10,564,249 B2
(45) Date of Patent: Feb. 18, 2020

(54) WAVEGUIDE STRUCTURE FOR USE IN DIRECTION-OF-ARRIVAL DETERMINATION SYSTEM AND ASSOCIATED DETERMINATION METHOD

(71) Applicant: HUAWEI TECHNOLOGIES CANADA CO., LTD., Kanata (CA)

(72) Inventors: Tarek Djerafi, Montreal (CA); Ke Wu, Montreal (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 110 days.

(21) Appl. No.: 14/802,420

(22) Filed: Jul. 17, 2015

(65) Prior Publication Data

US 2017/0016974 A1 Jan. 19, 2017

(51) Int. Cl.
*G01S 3/32* (2006.01)
*H01P 5/18* (2006.01)
(Continued)

(52) U.S. Cl.
CPC .............. *G01S 3/32* (2013.01); *H01P 5/18* (2013.01); *H01Q 1/50* (2013.01); *H01Q 13/00* (2013.01)

(58) Field of Classification Search
CPC ..... G01S 3/32; G01S 3/06; G01S 3/46; H01P 5/16; H01P 5/18; H01P 5/12; H01P 5/182;
(Continued)

(56) References Cited

U.S. PATENT DOCUMENTS 4,316,192 A * 2/1982 Acoraci ................ H01Q 3/242
342/373
5,134,417 A * 7/1992 Thompson ............ H01Q 3/40
342/373
(Continued)

FOREIGN PATENT DOCUMENTS

CN 101860387 A 10/2010
CN 104459607 A 3/2015
EP 2876460 A1 5/2015

OTHER PUBLICATIONS

Wu et al., A New Substrate Integrated Waveguide Six-port Circuit, 2010, IEEE ICMMT 2010 Proceedings, pp. 59-61.*
Djerafi et al., "60 GHz Substrate Integrated Waveguide Crossover Structure", Proceedings of 39th European Microwave Conference, Sep. 29-Oct. 1, 2009, pp. 1014-1017, Rome, Italy.
(Continued)

*Primary Examiner* — Bernarr E Gregory
*Assistant Examiner* — Daniel P Malley, Sr.
(74) *Attorney, Agent, or Firm* — BCF LLP (57) ABSTRACT

The waveguide structure is for determining Direction-of-Arrival of a signal received by first and second antennas spaced-apart from one another. The waveguide structure has a first input port connectable to the first antenna and connected to a first splitter; a second input port connectable to the second antenna and connected to a second splitter, the second input port being located adjacent to the first input port; a third splitter; and a fourth splitter. The waveguide structure has branches that connect input ports, splitters and output ports such that each output port provides a superposition of the signal received via the first antenna and the signal received by the second antenna. The waveguide structure has a phase shifting system that imparts at least a relative phase shift between the corresponding branches leading away from each corresponding splitter and has at least one cross-over junction formed between two of the branches.

20 Claims, 8 Drawing Sheets

(51) Int. Cl.
*H01Q 1/50* (2006.01)
*H01Q 13/00* (2006.01)

(58) Field of Classification Search
CPC .......... H01Q 1/50; H01Q 3/26; H01Q 3/2623; H01Q 3/40
See application file for complete search history.

(56) References Cited

U.S. PATENT DOCUMENTS

| | | | | |
|---|---|---|---|---|
| 6,650,910 | B1* | 11/2003 | Mazur | H04B 7/086 342/375 |
| 6,992,622 | B1* | 1/2006 | Chiang | H01Q 3/40 342/373 |
| 7,705,779 | B2* | 4/2010 | Goldberg | H01Q 3/40 342/373 |
| 2005/0035825 | A1* | 2/2005 | Carson | H01Q 21/0025 333/117 |
| 2009/0245411 | A1* | 10/2009 | Goldberg | H01Q 1/241 375/267 |
| 2011/0205119 | A1* | 8/2011 | Timofeev | H01Q 1/246 342/373 |
| 2013/0257680 | A1* | 10/2013 | Nix | H01Q 1/007 343/876 |

OTHER PUBLICATIONS

Huyart et al., "A Direction-Finding Antenna System Using an Integrated Six-Port Circuit", IEEE Transactions on Antennas and Propagation, vol. 53, No. 12, Dec. 1995, pp. 1508-1512.

Moldovan et al., "A New 94 GHz Collision Avoidance Radar Sensor Using Six-Port Phase Frequency Discriminator", IEEE Transactions on Microwave Theory and Techniques, vol. 52, No. 3, pp. 751-759, 2004.

Vinci et al., "A Wide-Range 77 GHz Direction of Arrival Detector with Integrated Dual Six-Port Receiver", Microwave Symposium Digest (MIT), Jun. 17-22, 2012., pp. 1-3, Montreal Canada.

Djerafi et al., "Design and Implementation of a Planar 4×4 Butler Matrix in SIW Technology for Wide Band High Power Applications", Progress in Electromagnetics Research B, vol. 35, 29-51, 2011.

Tatu et al., "Direction-of-Arrival Estimation Method Based on Six-Port Technology", Microwaves, Antennas and Propagation, IEE Proceedings, vol. 153, Issue 3, pp. 263-269, Jun. 19, 2006.

SIPO of the P.R. China; International Search Report and Written Opinion issued in corresponding international Application No. PCT/CN2016/075857 dated May 27, 2016.

Vinci, G., Linz, S., et Koelpin, A. Estimation error analysis and compensation of dual Six-Port based DOA Detection. In : Antennas and Propagation in Wireless Communications (APWC), 2014 IEEE-APS Topical Conference on. IEEE, 2014. p. 217-220.

* cited by examiner

FIG. 12 ated Determination Method

FIELD

The improvements generally relate to the field of determination of Direction-of-Arrival (DoA) of radio signals and more specifically to determination based on phase interferometry.

BACKGROUND

Direction-of-arrival (DoA) estimation is required in many contexts, such as mobile communications, radar, and satellite communications. The information it provides can be used for localization purposes and for radio channel modeling. DoA estimation systems can use amplitude and/or phase information from an antenna or from an array of antennas to determine the direction from which a radio signal originates.

The publication "Direction-of-arrival estimation method based on six-port technology" by S. O. Tatu et al, IEE Proc.-Microw. Antennas Propag., Vol. 153, No. 3, June 2006, p. 263-269, in particular, presents a laboratory demonstration of DoA determination using a technique referred to as phase interferometry. More specifically, a phase interferometer uses a waveguide structure referred to as a six-port junction, comparable to the one shown in FIG. 1, for phase discrimination. In this configuration, two antennas are spaced apart from one another in a detection plane by a separation distance, and the difference between the detected phases of the signal between the two antennas is used to determine the DoA (in two dimensions, within the detection plane). A higher separation distance in the system can lead to a higher angular resolution. However, separation distances larger than the wavelength of the impinging signal can lead to ambiguities due to a phase wrap effect. This phase wrap effect is due to the nature of the phase difference of the signals received by the system, and depends on the ratio between the wavelength $\lambda$ of the detected signal and the distance L between the receiving antennas. For $L/\lambda$ 0.5 the complete half-plane DoA range is covered by the range of $\Delta\phi$. This leads to a non-ambiguous DoA detection. For $L/\lambda > 0.5$, the phase will wrap within the chosen DoA range thus leading to ambiguity.

While this demonstration was satisfactory to a certain degree, there remained room for improvement. Particularly in terms of developing a technology to allow manufacturing at an industrial scale and at a satisfactorily low cost. For instance, in order to position the antennas sufficiently close to one another, additional transmission lines were required between the antennas and the input ports and these were undesirable.

SUMMARY

In accordance with one aspect, there is provided a waveguide structure generally having a two-dimensional layout. The waveguide structure is for use in determining Direction-of-Arrival of a signal received by both a first antenna and a second antenna spaced-apart from one another in a plane of detection. The waveguide structure has a first input port connectable to the first antenna and connected to a first splitter. The waveguide structure has a second input port connectable to the second antenna and connected to a second splitter, wherein the second input port is located adjacent to the first input port. The waveguide structure has a third splitter and a fourth splitter. The waveguide structure has a first branch which connects the third splitter to a first output port; a second branch which connects the third splitter to a second output port; a third branch which connects the fourth splitter to a third output port; a fourth branch which connects the fourth splitter to a fourth output port; a fifth branch which connects the first splitter to the third splitter; a sixth branch which connects the first splitter to the fourth splitter; a seventh branch which connects the second splitter to the third splitter and a eighth branch which connects the second splitter to the fourth splitter. Each output port provides a superposition of the signal received via the first antenna and the signal received by the second antenna. The waveguide structure has a phase shifting system associated to at least the third and fourth splitters which imparts at least a relative phase shift between the corresponding branches leading away from each corresponding splitter in a manner that the superposition of signals of each output port has a phase combination of the phase of the signal received via the first antenna and the phase of the signal received via the second antenna which is different from the phase combination of the other output. The waveguide structure has at least one cross-over junction formed between two of the branches.

In accordance with another aspect, there is provided a Direction-of-Arrival (DoA) determination system. The DoA determination system has a first antenna and a second antenna spaced-apart from one another in a plane of detection by a distance smaller than a wavelength of interest, for each receiving a signal. The DoA determination system has a waveguide structure. The waveguide structure has a first input port connectable to the first antenna and connected to a first splitter; a second input port connectable to the second antenna and connected to a second splitter, wherein the second input port is located adjacent to the first input port. The waveguide structure has a third splitter and a fourth splitter. The waveguide structure has a first branch which connects the third splitter to a first output port, a second branch which connects the third splitter to a second output port, a third branch which connects the fourth splitter to a third output port, a fourth branch which connects the fourth splitter to a fourth output port, a fifth branch which connects the first splitter to the third splitter, a sixth branch which connects the first splitter to the fourth splitter, a seventh branch which connects the second splitter to the third splitter and a eighth branch which connects the second splitter to the fourth splitter. Each output port provides a superposition of the signal received via the first antenna and the signal received by the second antenna. The waveguide structure has a phase shifting system associated to at least the third and fourth splitters which imparts at least a relative phase shift between the corresponding branches leading away from each corresponding splitter in a manner that the superposition of signals of each output port has a phase combination of the phase of the signal received via the first antenna and the phase of the signal received via the second antenna which is different from the phase combination of the other output; and at least one cross-over junction formed between two of the branches.

In accordance with another aspect, there is provided a method of determining a direction of arrival of an incoming radio signal. The method has a step of receiving the incoming radio signal independently by a first antenna and a second antenna, wherein the antennas are spaced-apart from one another in a plane of detection. The method has steps of conveying the signal A1 received by the first antenna to a first splitter; conveying the signal A2 received by the second antenna to a second splitter; conveying the signal from the first splitter to both a third splitter along a first branch and a fourth splitter along a second branch, conveying the signal from the second splitter to both the third splitter along a third branch and to the fourth splitter along a fourth branch; conveying the signal from the third splitter to a first output port along a fifth branch and to a second output port along a sixth branch; and conveying the signal from the fourth splitter to a third output port along a seventh branch and to a fourth output port along an eighth branch. The method has a step of shifting the phase of one downstream branch relative to the other downstream branch for each of the third and fourth splitters in a manner to impart unique phase combinations at each one of the four output ports. The method has a step of crossing-over the signal between at least two of the branches and a step of determining the direction of arrival of the radio signal in the plane of detection based on the signals received from the first, second, third and fourth output ports.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
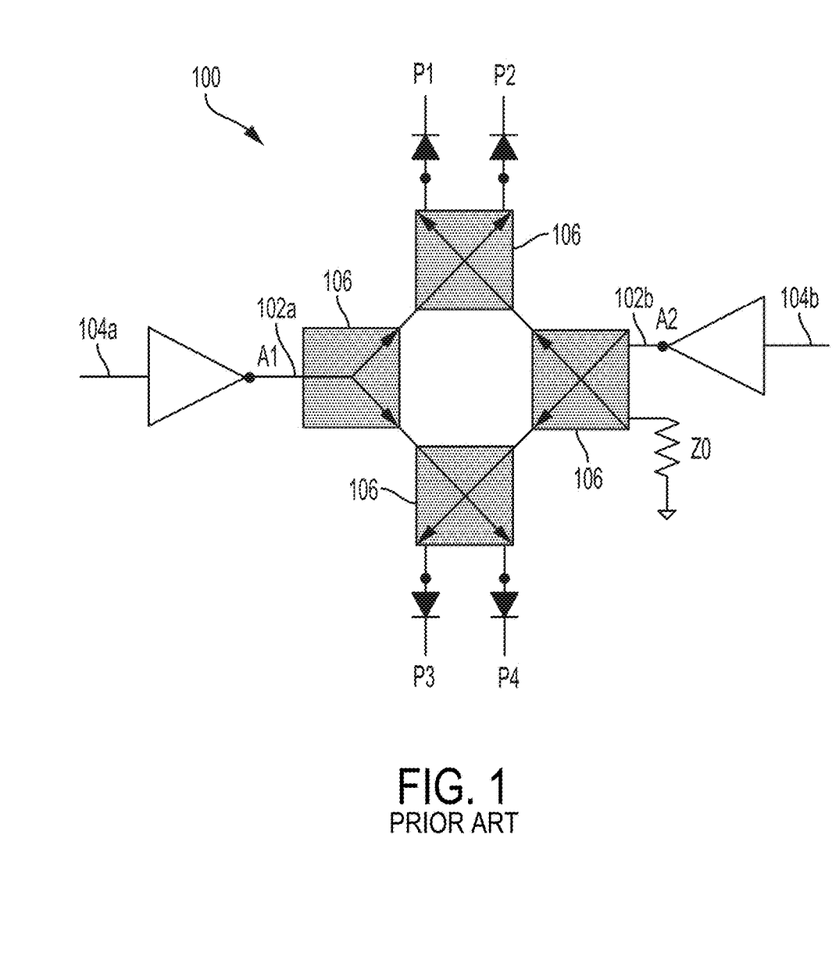
FIG. 1 is a schematic view of a waveguide structure in accordance with the prior art.

An example of a traditional six-port configuration 100 is schematized in FIG. 1, generally showing a first input port 102*a* for connection to the first antenna 104*a*, a second input port 102*b* for connection to the second antenna 104*b*, and four splitters 106 connecting each one of the two input ports 102*a*, 102*b* to four output ports P1, P2, P3 and P4. Power detectors are used at the output ports P1, P2, P3 and P4 to obtain the baseband signals and analog or digital signal processing of the output baseband signals allows for determining direction-of-arrival. Between the input ports 102*a*, 102*b* and output ports P1, P2, P3 and P4, apart from being split (and optionally amplified), the signals are phase shifted and combined in a manner so that each one of the output ports P1, P2, P3 and P4 has a sum of the signal from the first antenna 104*a* and the second antenna 104*b* with a unique phase combination. In order to reduce the processing which can be required to calculate direction of arrival, it was known to use phase shifting of 90° and branching in a manner to provide a first pair of output ports P1 and P2 leading to a signal referred to as the I signal, and a second pair of output ports P3 and P4 leading to a signal referred to as the Q signal, the I signal and the Q signal being indicative of direction of arrival within a given margin of error.

In order to embody a DoA system having such a six-port configuration 100 in a manner industrially manufacturable at a satisfactory low cost, it was found to be preferable to integrate all the components into a single circuit (preferably part of a single circuit board substrate), and to avoid additional transmission lines to the antennas if possible, the latter being susceptible to narrowing the workable bandwidth of the system (among other potential inconveniences). Moreover, it was also sought to group the output ports in close proximity to one another, in order to allow practicality in connecting the output ports of the six-port junction waveguide structure 100 to other electrical components of the DoA system, such as a decoder for instance.

Different known technologies can be used to embody a six-port junction 100 such as schematized in FIG. 1. A first one of these is the SIW (substrate integrated waveguide) technology, and a second one of these is the microstrip technology. Both these technologies can be used in making a six-port junction part of a planar substrate in which the splitters are positioned at the four corners of a square. Moreover, these technologies have inherent limitations in terms of miniaturization. More specifically, in the case of SIW technology, there was found to be a barrier limiting the applicability of the technique to sizes smaller than 6.6×6.6 mm$^2$. The antennas being positioned at two opposite corners of such a square, the minimum distance between the input ports was thus 9.33 mm, which was still higher than the maximum half-wavelength of the wavelengths of interest. In the case of the microstrip technology, for instance, dimensions as small as 3.5 mm×3.5 mm were achievable, but the minimum distance between the input ports was still higher than the maximum half-wavelength of the wavelengths of interest. Moreover, unlike SIW, microstrip technology is not shielded, and can thus be prone to suffer from interferences. It will be noted here that a substrate integrated waveguide is typically formed with a densely arrayed via hole or post structure interconnecting upper and lower metal plates which sandwich a dielectric substrate in which the electromagnetic waves are guided. It will be noted that a high permittivity substrate can be used to favor size reduction. In an embodiment, alumina can be used, for instance, which has high permittivity at 60 GHz.

Figure 2:
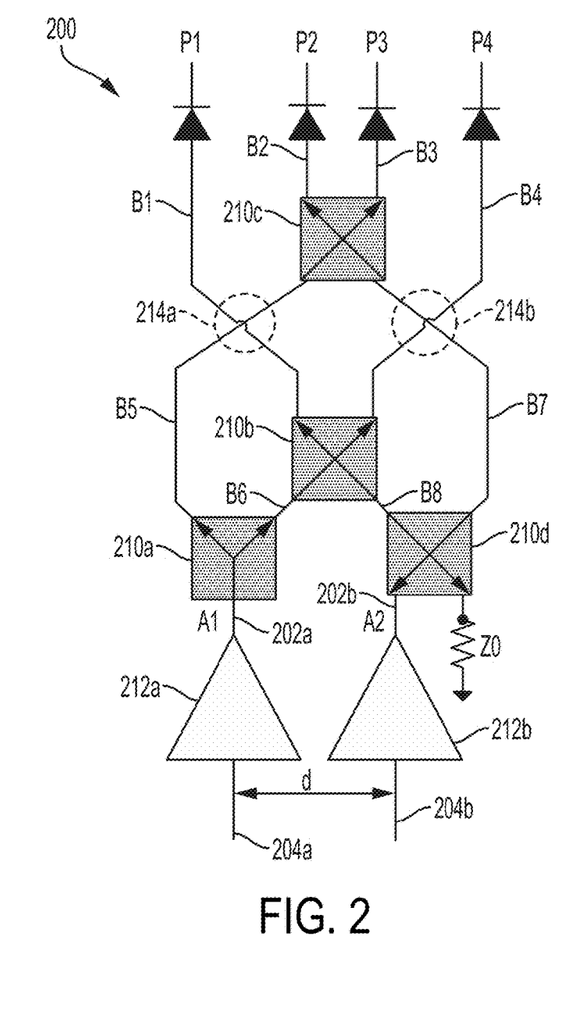
FIG. 2 is a schematic view of a first example of a waveguide structure.

At least some of the limitations of the prior art were overcome by a waveguide structure which can be referred to herein as the new six-port junction design 200, an example of which is schematized in FIG. 2. More specifically, the new six-port junction 200 still has, formed on a common substrate, two input ports 202*a*, 202*b* associated to corresponding antennas 204a, 204b, four output ports P1, P2, P3 and P4, and circuit elements 210a-d for splitting and phase shifting the signals from the input ports 202a, 202b in a manner to create the four distinct phase combinations of the two antenna signals at the output ports P1, P2, P3 and P4. However, as opposed to the traditional six-port design 100 shown in FIG. 1, the new six-port junction design 200 has input ports 202a, 202b which are physically grouped near one another, which allows for achieving a distance d between the input ports 202a and 202b which can be significantly smaller than 9.33 mm, and even smaller or equal to the half wavelength of the wavelengths of interest in at least some applications. Moreover, as shown in FIG. 2, the output ports P1, P2, P3 and P4 can also be physically grouped near one another which can, in some embodiments, be very practical in connecting the output ports P1, P2, P3 and P4 to subsequent electronic components of the system.

Figure 3:
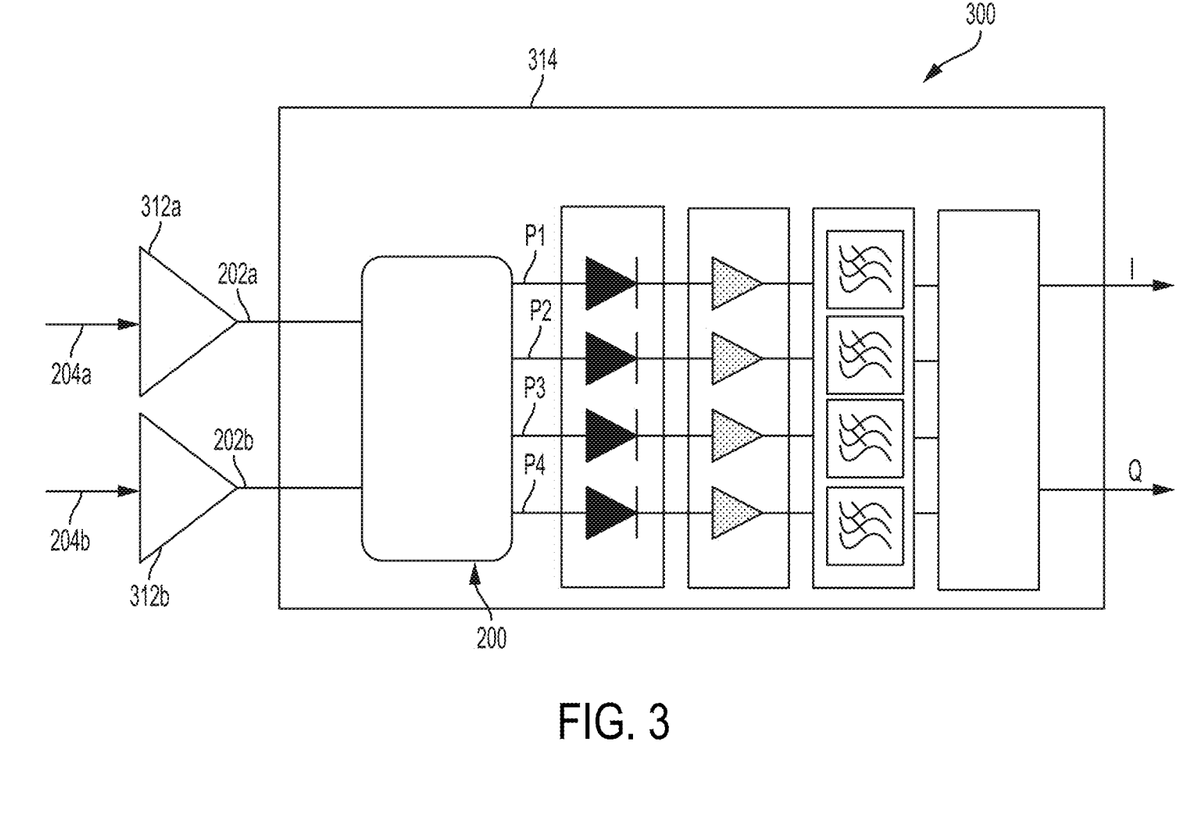
FIG. 3 is a schematic view of a DoA determination system having the waveguide structure of FIG. 2 integrated therein.

A new six-port junction design 200 such as shown in FIG. 2 can be incorporated onto a unitary circuit board as part of a DoA system 300 such as shown in FIG. 3. In the DoA system 300 of FIG. 3, the antennas 204a, 204b are directly connected to the input ports 202a, 202b of the six-port junction 200 and can even be made integral thereto, and the output ports P1, P2, P3 and P4 can be connected to subsequent electronic components used in processing and decoding the four different phase combinations of the signals which can be computer processed, or otherwise acquired, to determine the DoA, display the DoA data on a user interface and/or store the DoA data onto a computer-readable memory, for instance.

Referring back to FIG. 2, the new six-port junction design 200 will now be described in further detail. The first antenna 204a can be connected directly to the first input port 202a, such as by making the first antenna 204a integral to the first input port 202a for instance, or can be connected indirectly to the first input port 202a. Similarly, the second antenna 204b can be connected directly or indirectly to the second input port 202b. In this embodiment, it is preferred to connect the antennas 204a, 204b to the input ports 202a, 202b as directly as possible, in order to avoid inconveniences which can otherwise be associated with additional transmission lines. Amplifiers were found useful in achieving a satisfactory degree of precision, and each input port was provided with a dedicated low noise amplifier 212a, 212b in this example. In alternate embodiments, the amplifiers can be omitted.

The signal from the first antenna 204a is split into two branches by a first splitter 210a to feed a second and a third splitters 210b, 210c each leading to the four output ports P1, P2, P3 and P4 via two corresponding branches. Similarly, the signal from the second antenna 204b is split into two by a fourth splitter 210d which also feeds the second and the third splitters 210b, 210c via two corresponding branches. The waveguide structure 200 further has phase shifting components which are used to shift the phase of the signals in a manner so that the superposition of the first signal and the second signal provided at each one of the output ports has a unique combination of phases which are used in discriminating possible ambiguities in the DoA determination. In this embodiment, it was found practical to provide the second, third, and fourth splitters 210b-d in the form of corresponding directional couplers which can each advantageously perform a 90° phase shifting operation between their two downstream branches in addition to splitting. It will be noted here that the phase shifting can be performed differently in alternate embodiments, such as by distinct components for instance.

It will be noted here that the new six-port junction design 200 schematized in FIG. 2, also differs from the six-port junction design 100 schematized in FIG. 1 in that in the connection branch between the first splitter 210a and the third splitter 210c, and the connection branch between the second splitter 210b and the first output port P1 cross each other if embodied on a two-dimensional surface such as a SIW or microstrip. Similarly, the connection branch between the second splitter 210b and the fourth output port P4 and the connection branch between the fourth splitter 210d and the third splitter 210c are shown to cross each other. In fact, electrical connection between these connection branches is undesirable because it would lead to undesired signal splitting and redirecting. In one embodiment where the new six-port junction design 200 is embodied onto a flat, two-dimensional substrate, undesired electrical connection between these connection branches is avoided by use of a crossover structure. Accordingly, the waveguide structure 200 schematized in FIG. 2 can be industrially produced in the form of a SIW, in the form of a metallic waveguide structure, or in the form of a microstrip, the two former being preferred for their shielded nature.

Referring now again to FIGS. 2 and 3, the details of a specific embodiment will be provided in order to provide a thorough description and is not to be interpreted limitatively. A first antenna 204a is made integral to a wafer board substrate 314 and connected to a first input port 202a of the six-port junction 200 via a first amplifier 312a. A second antenna 204b is also made integral to the wafer board substrate 314 and is connected to the second input port 202b via a second amplifier 312b. The amplifiers 312a, 312b are optional but can be useful in achieving a satisfactory resolution. As will be noted, the signal (A1, A2) of each antenna goes through a cascade of two splitters which successively divide each signal and convey each signal to the four output ports (P1, P2, P3, P4). For ease of reference, the portions of the waveguide structure 200 which connect the splitters 210a-d to a subsequent splitter or to an output port will be referred to herein as branches. Moreover, the branches will be attributed arbitrary numbers to allow future reference. Accordingly, a first branch B1 can be said to connect the second splitter 210b to a first output port P1, a second branch B2 to connect the third splitter 210c to a second output port P2, a third branch B3 to connect the third splitter 210c to a third output port P3, a fourth branch B4 to connect the second splitter 210b to a fourth output port P4, a fifth branch B5 to connect the first splitter 210a to the third splitter 210c, a sixth branch B6 to connect the first splitter 210a to the second splitter 210b, a seventh branch B7 to connect the fourth splitter 210d to the third splitter 210c and a eighth branch B8 to connect the second splitter 210b to the fourth splitter 210d. The relative positioning of the splitters 210a-d and of the branches referred to above can be referred to as an 'arrow' configuration. Similarly to the numbering of the splitters and ports, it will be stressed here that the numbering of the branches is perfectly arbitrary and for the sake of ease of reference. More specifically the numbering is thus not to be interpreted limitatively as implying any associated feature other than those explicitly referred to. It will also be noted here that in alternate embodiments, the branching configuration can vary. In some embodiments, a first cross-over junction 214a and a second cross-over junction 214b can be used and both be formed across one of the first, second, third, and fourth branches B1, B2, B3, B4 and one of the fifth, sixth, seventh, and eighth branches B5, B6, B7, B8 using the arbitrary numbering provided above. In other embodiments, only a single cross-over junction can be used, between any two suitable branches. For instance, in an alternate embodiment, the splitters 210a-d can be positioned in a square configuration instead of in an arrow configuration, with the splitters receiving the signals from the antennas 204a, 204b (i.e. the first and second splitters 210a, 210b) being adjacent to one another on one edge of the square, and the splitters leading to the output ports (i.e. the third and fourth splitters 210c, 210d) being on the other edge of the square, with the branch leading from the first splitter 210a to the fourth splitter 210d and the branch leading from the second splitter 210b to the third splitter 210c crossing over one another, and with branches leading away from the third and fourth splitters 210c, 210d crossing over or not.

Moreover, as they are being divided and subdivided, some of the divided and subdivided signals are phase shifted whereas others are not, leading to the desired, respective phase combinations in the superposition of the signals A1 and A2 at each output port. In this specific embodiment, this is done in a manner to achieve the I and Q signals according with established standards as this can lead to a more direct reading of DoA and require less processing than what could otherwise be required. For instance, a pair of output ports leading to the I signal can have a first port where the phase of the signal A2 is shifted by 90° from A1 (A1+jA2) and a second port where the phase of the signal A2 is shifted by −90° from the phase of A1 (jA1+A2), and a pair or output ports leading to the Q signal can have a first port where the phase of A2 is shifted from 180° relative to A1 (A1+$j^2$A2) and a second port where the phase of A2 is the same than the phase of A1 (jA1+jA2)(where j represents a 90° phase shift from the original undivided signal). The ports leading to the I signal can be adjacent to one another, or interspersed with the ports leading to the Q signal.

Such phase shifting can be performed in a number of ways. In this embodiment, it was found practical to use directional couplers as the second, third and fourth splitters 210b, 210c, 210d as directional couplers are easy to manufacture and both divide the signal they receive and phase shift the two subdivided signals by 90° relative to one another. The first splitter 210a was selected here to be a simple power divider which maintains the original phase. For instance, in the embodiment illustrated, the first output port P1 can have the signal A1+jA2, the second output port P2 can have the signal A1+$j^2$A2, the third output port P3 can have the signal jA1+jA2, and the fourth output port P4 can have the signal jA1+A2. In an alternate embodiment, all four of the splitters 210a-d can be directional couplers, with the first and second ones each having an insulated input port. In still another embodiment, the first and second splitters 210a, 210b can be power dividers. In yet another alternate embodiment, power dividers can be used as all the splitting and the phase shifting can be performed by separate structures/components, for instance. In still other embodiments, the phase shifting can be of 60° or of another angle to form other signals than the standard I and Q signals which can then be computer processed to determine DoA.

In this embodiment, it was found advantageous to use a structure which can be referred to as a 0 dB coupler as the cross-over junction. Example embodiments of 0 dB couplers embodied to a SIW-based circuit are shown at 1020 in FIG. 10, for instance, and also described at pages 1014 to 1017 of the proceedings of the $39^{th}$ European Microwave Conference (29 Sep.-1 Oct. 2009) in the article entitled 60 GHz Substrate Integrated Waveguide Crossover Structure, by Tarek Djerafi and Ke Wu. In alternate embodiments, pairs of 3 dB couplers such as were traditionally used to perform connectionless cross-over can be used instead of the 0 dB coupler referred to above, for instance. An example of the 3 dB coupler is shown at 1022 in FIG. 10, for instance.

Figure 4A:
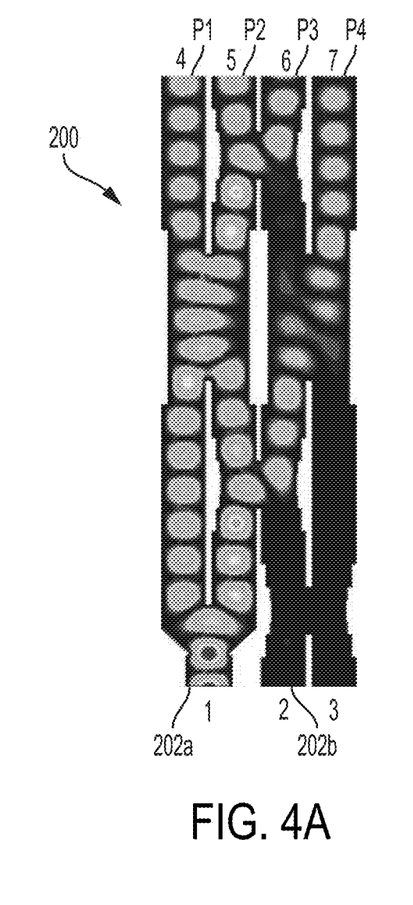
FIGS. 4A, 4B and 4C are graphical representations of a signal propagating across the waveguide structure of FIG. 2 from the first input port to four output ports.
Figure 4B:
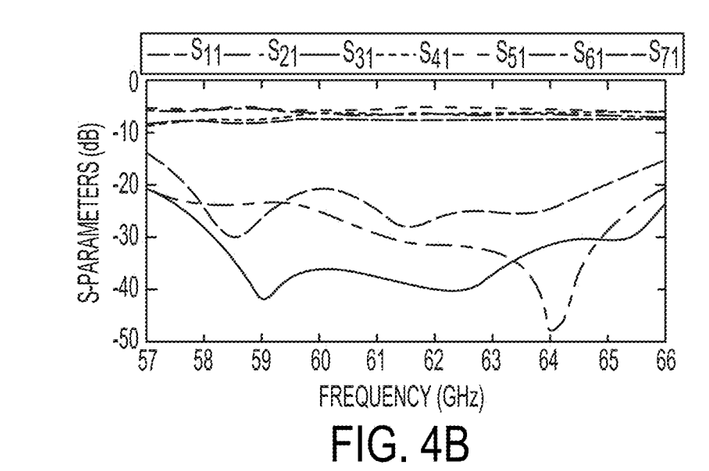
Figure 4C:
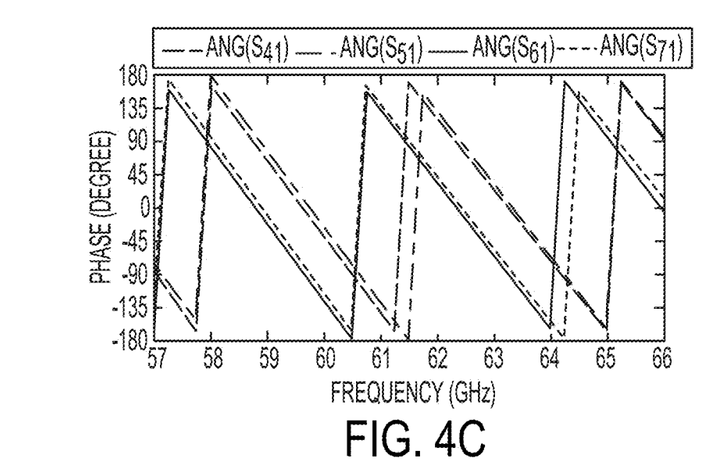
Figure 5A:
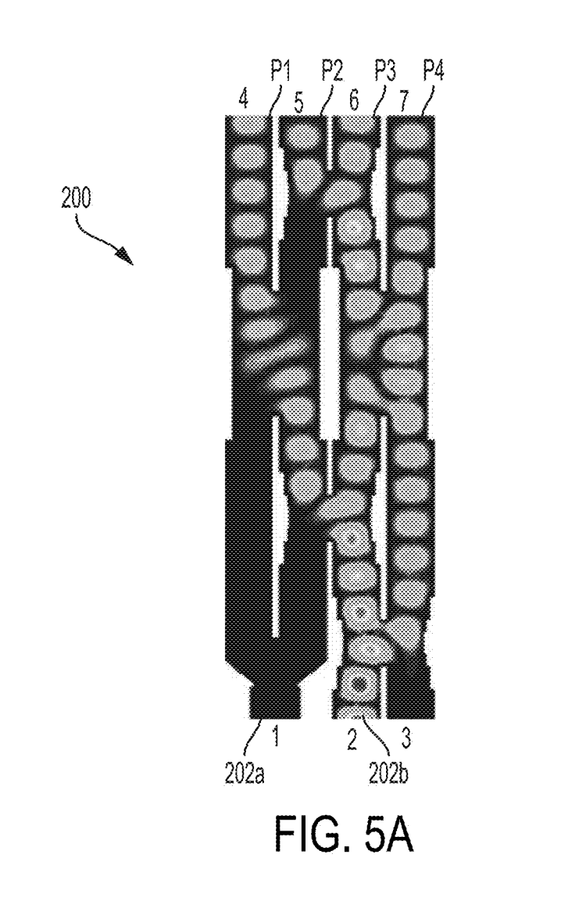
FIGS. 5A, 5B and 5C are graphical representations of a signal propagating across the waveguide structure of FIG. 2 from the second input port to four output ports.
Figure 5B:
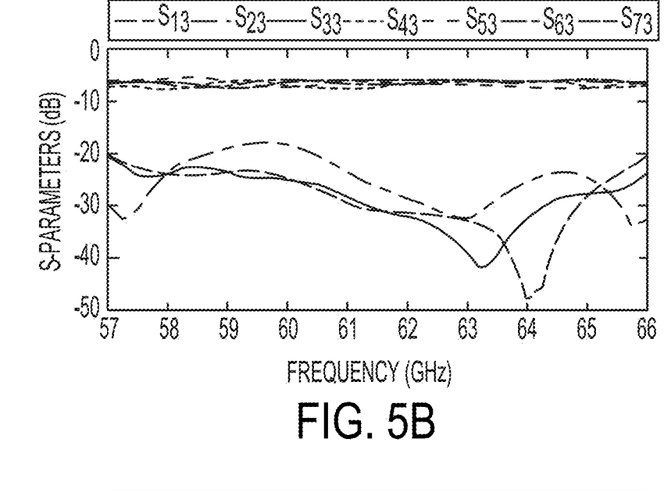
Figure 5C:
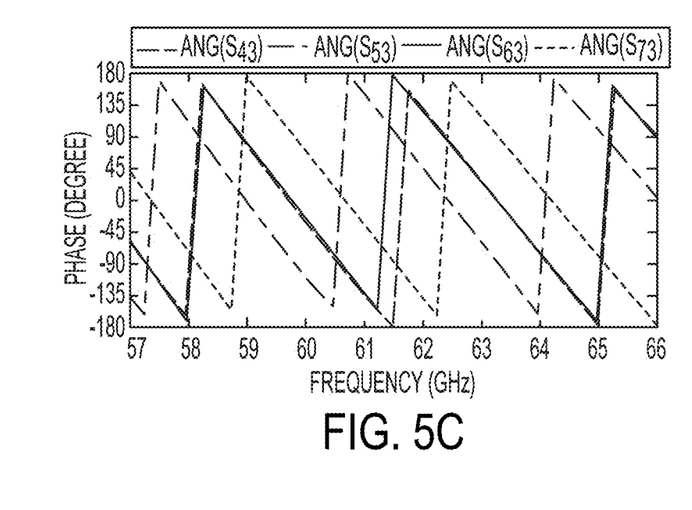
Figure 6:
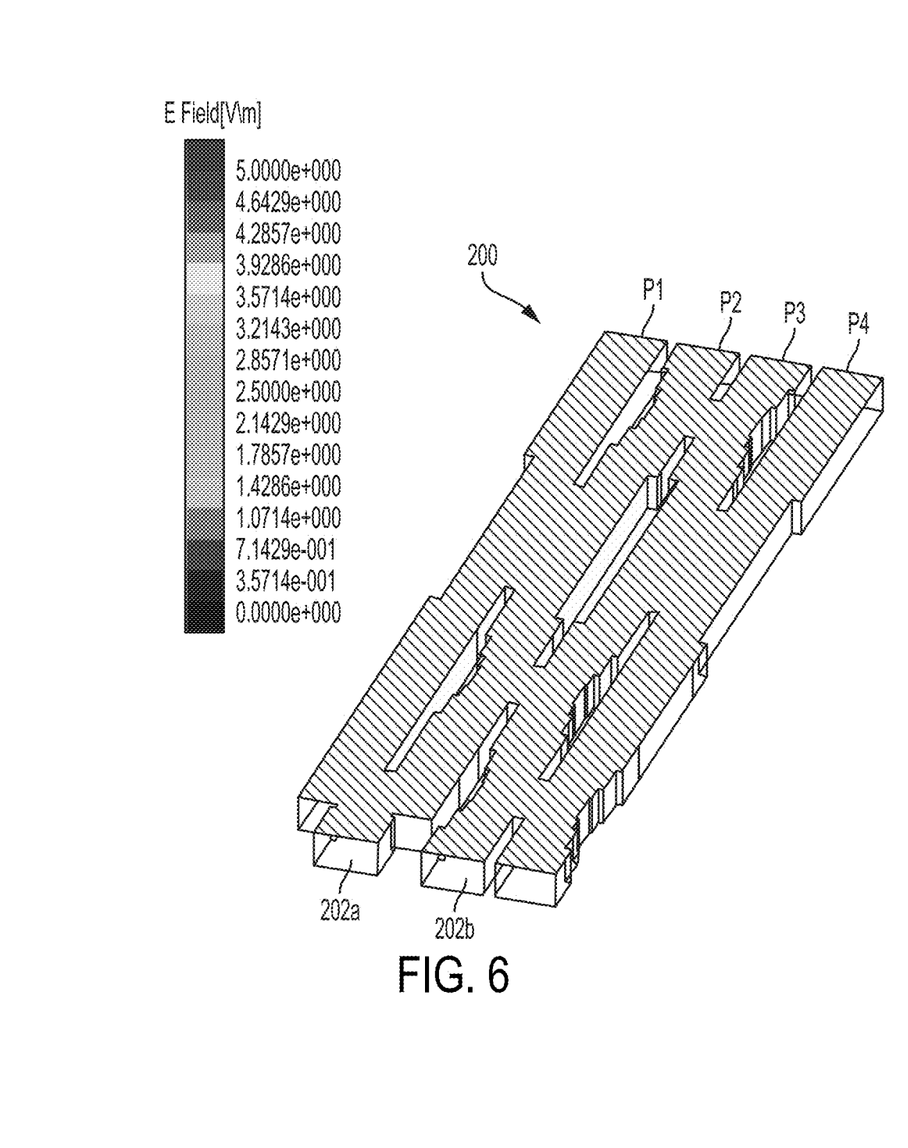
FIG. 6 is an oblique perspective view of a waveguide structure formed in a substrate integrated waveguide in accordance with the schematic of FIG. 2.

Referring now to FIG. 6, an example of a specific SIW waveguide structure 200 which can be used in this embodiment is shown. The transmission of signals in this SIW waveguide structure 200 was modelized, with the transmission of a signal through the first input port 202a being modelized in FIGS. 4A to 4C, and the transmission of a signal through the second input port 202b being modelized in FIGS. 5A to 5C. More specifically, FIGS. 4A and 5A show field distribution, FIGS. 4B and 5B show isolation matching and transmission coefficient, and FIGS. 4C and 5C show phase characteristics. The isolation between port 1 (i.e. input port 202a) and the other input ports is greater than 20 dB over the frequency band from 57 to 66 GHz. As presented, the simulated transmission coefficients are well equalized around 6.7 dB and are close to theoretical predicted value of 6.02 db. The difference between theory and simulation is due to the insertion losses of the couplers. The maximum amplitude dispersion in the simulation is less than 0.5 dB over the desired frequency bandwidth. Over the full operating frequency range, simulated average phase differences show 5 degree of difference compared to theoretical values. The results of the modelization are conclusive. As will be understood from the above, a more "parallel" topology can be achieved, with H-plane short-slot couplers being combined in the example proposed design to produce a traditional amplitude and phase distribution.

Figure 7:
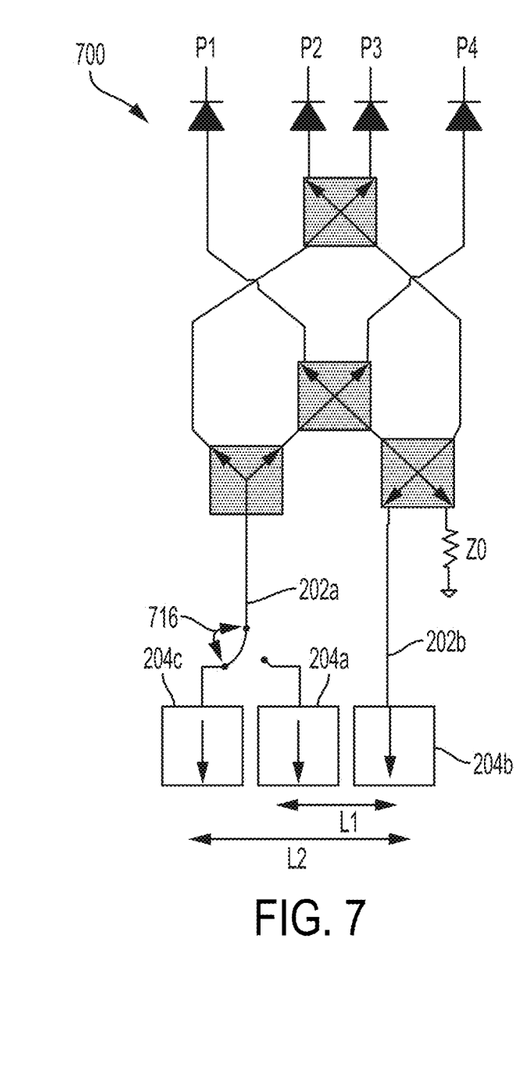
FIG. 7 is a schematic view of a second example where three antennas are used to solve potential DoA ambiguities.

An additional antenna spacing can be used in some embodiments in order to resolve remaining potential ambiguities in the signals. This can be useful if the initial antenna spacing is of between a half and the entirety of the wavelength of interest, for instance, where an additional antenna spacing being of a prime integer of the initial antenna spacing can be used to resolve ambiguity stemming from this type of initial antenna spacing. The additional antenna spacing can be achieved using a separate, dedicated waveguide structure identical to the first waveguide structure and one or two additional antennas. Alternately, as shown in the embodiment illustrated in FIG. 7, an additional antenna spacing L2 can be achieved in a configuration using a single waveguide structure 700, by using a third antenna 204c which is positioned along the same axis as the first and second antennas 204a, 204b, which is spaced from the second antenna 204b by a distance L2 (with the first antenna 204a being spaced from the second antenna 204b by a distance L1), and wherein a switch 716 can be used to selectively connect a given one of the first antenna 204a and the third antenna 204c to the first input port 202a. Accordingly, with such a configuration, the switch 716 can be positioned to connect the first antenna 204a and, in the event where ambiguity must be resolved, operated to connect the third antenna 204c to the first input port 202a instead and the resulting signal combinations be used to resolve the ambiguity. In an alternate embodiment, the second antenna spacing can be provided in a separate, independent system. Accordingly, useful embodiments of the direction-of-arrival determination system can be provided for antenna spacings of not only less than half of the wavelength of interest, but also for antenna spacings of between half of the wavelength of interest and the full wavelength of interest, or even above the wavelength of interest.

In alternate embodiments, configurations can be selected in order to obtain a three-dimensional direction-of-arrival determination rather than a two-dimensional direction-of-arrival determination. More specifically, the configurations described above typically use a combination of two antennas spaced in a first plane of detection to determine a direction of arrival in the form of an angle of arrival within that first plane of detection. The general concept in obtaining a three-dimensional direction-of-arrival determination is to combine the determination of direction-of-arrival in a first plane of detection with a determination of direction-of-arrival in a second plane of detection which is perpendicular to the first plane of detection. In these cases, the first plane of detection can be horizontal and used to determine an azimuth angle of arrival, for instance, and the second plane of detection can be vertical and be used to determine an elevation of arrival, for instance. Various embodiments can be used to achieve this, a first one being a simple duplication of a direction-of-arrival determination system as presented above with each one of the pair being oriented perpendicular to one another. Other embodiments which can potentially be more advantageous than a simple duplication are now presented. For instance, instead of using two pairs of antennas (one for each system), it is possible to use three antennas with one of the antennas cooperating with the two other antennas spaced therefrom in orthogonal directions and being equipped with appropriate amplification if required. Moreover, as will be demonstrated, a single waveguide structure can be used to obtain the readings from both orthogonal antenna spacings instead of separate waveguide structures.

Figure 11:
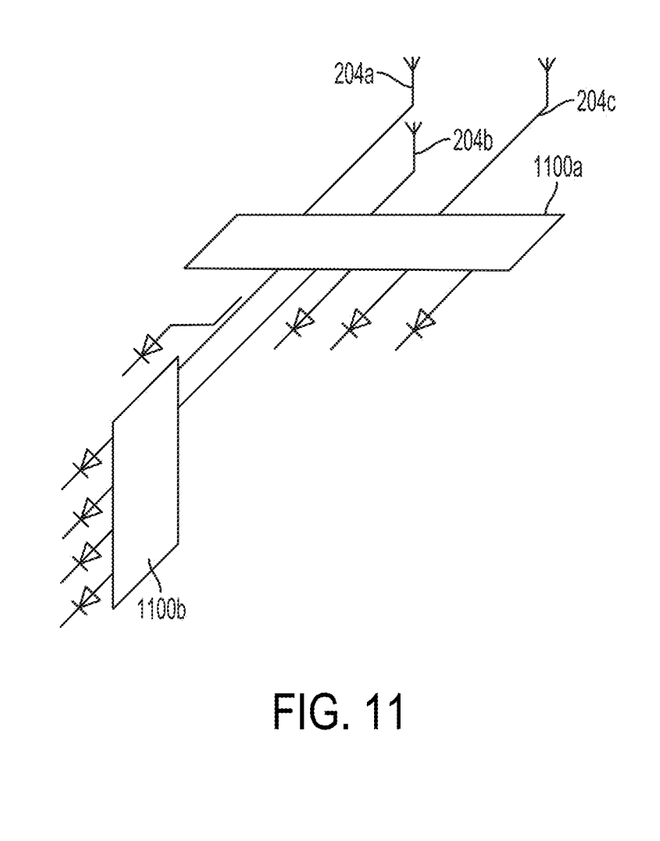
FIG. 11 is a schematic view of a fifth example where two waveguide structures are cascaded with three antennas in order to determine both an azimuth DoA and an elevation DoA.

Beginning with the embodiment shown in FIG. 11, this embodiment shows an example of two waveguide structures 1100*a*, 1100*b* being used in cascade each with a corresponding, orthogonal, antenna spacing. In this embodiment, three antennas 204*a-c* are used though it will be understood that four antennas can be used instead in alternate embodiments.

Figure 8:
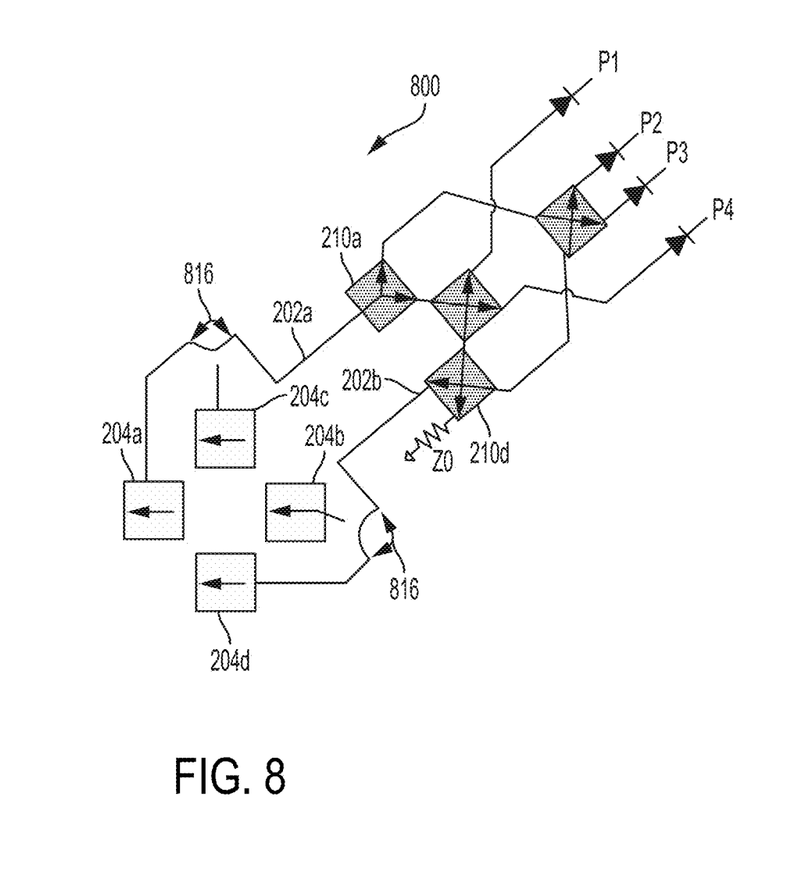
FIG. 8 is a schematic view of a third example where four antennas are used in two perpendicular planes in order to determine both an azimuth DoA and an elevation DoA.

Turning now to FIG. 8, an example of an embodiment offering three-dimensional direction-of-arrival determination with a single waveguide structure 800 is illustrated. In this embodiment, two orthogonal pairs of antennas 204*a-d* are used, and switches 816 are provided to switch from the first pair of antennas 204*a*, 204*b* (e.g. azimuth) to the second pair of antennas 204*c*, 204*d* (e.g. elevation) when desired.

Figure 9:
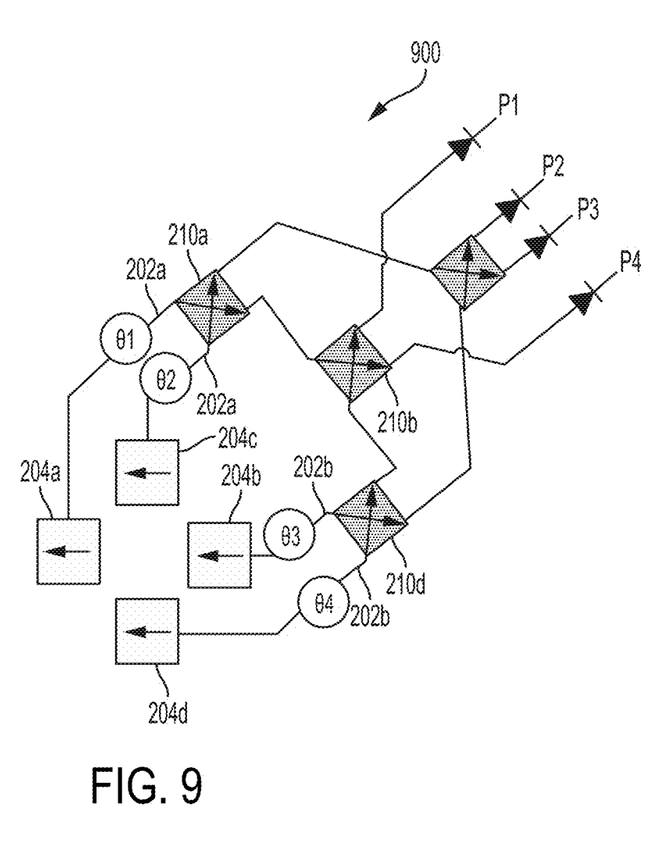
FIG. 9 is a schematic view of a fourth example where four antennas are used in two perpendicular planes in order to determine both an azimuth DoA and an elevation DoA.
Figure 10:
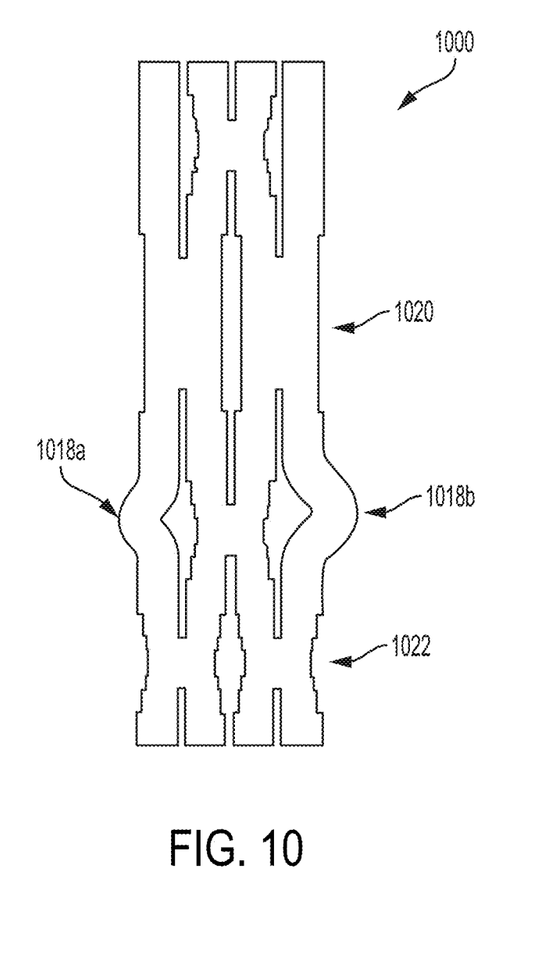
FIG. 10 is an example of a substrate integrated waveguide matrix which can be used in the example of FIG. 8 or FIG. 9.

In the embodiment shown in FIG. 9, a waveguide structure 900 having two orthogonal pairs of antennas 204*a-d* is shown. The two pairs of antennas 204*a-d* are both permanently connected to corresponding input ports 202*a-d* of the waveguide structure 900. Directional couplers are used as the first splitter 210*a* and the fourth splitter 210*d*, and each have both input ports 202*a* or 202*b* connected to a respective one of the two corresponding antennas. The superposition of signals at the output ports P1, P2, P3 and P4 will be understood to be a superposition of signals from the four antennas 204*a-d*, but appropriate processing can be performed thereon to resolve both the direction of arrival in the two orthogonal planes. 61, 62, 63, and 64 represent additional phase shifters. FIG. 10 shows an example of a waveguide structure 1000 which can be used for such an embodiment, and which incorporates phase shifters 1018*a*, 1018*b* to compensate the phase in two of the branches. In this specific embodiment, the illustrated example of the waveguide structure 1000 has cross-over junctions provided in the form of 3 dB couplers 1022 and 0 dB couplers 1020.

Figure 12:
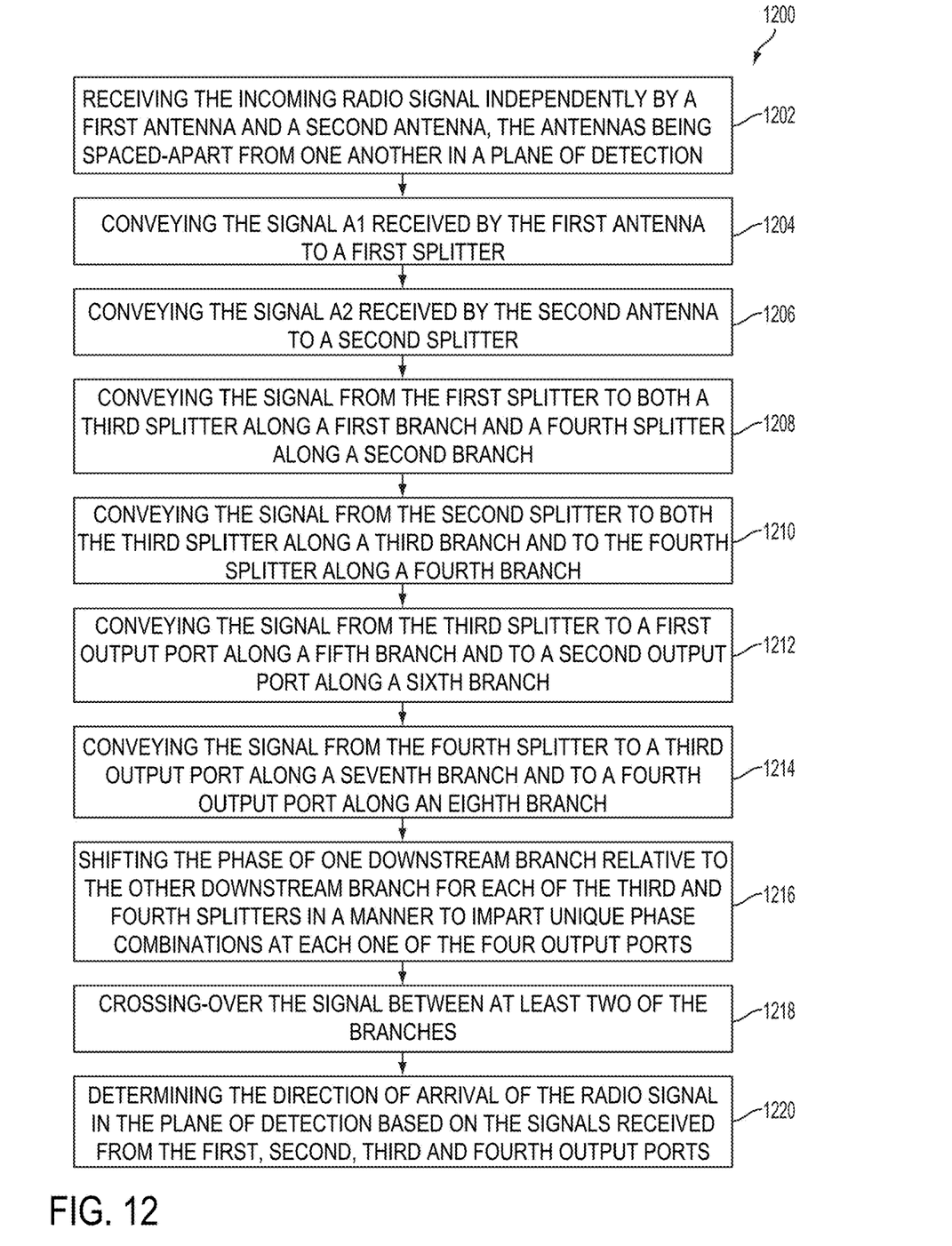
FIG. 12 is a flowchart showing an example of a method of determining a direction of arrival of an incoming radio signal, in accordance with an embodiment.

FIG. 12 shows a flowchart of a method 1200 of determining a direction of arrival of an incoming radio signal, in accordance with an embodiment. Referring to FIG. 2 and to FIG. 12, the method 1200 has a step 1202 of receiving the incoming radio signal independently by the first antenna 204*a* and the second antenna 204*b*, the antennas 204*a*, 204*b* being spaced-apart from one another in a plane of detection. The method 1200 has a step 1204 of conveying the signal A1 received by the first antenna 204*a* to the first splitter 210*a*; a step 1206 of conveying the signal A2 received by the second antenna 204*b* to the second splitter 210*b*; a step 1208 of conveying the signal from the first splitter 210*a* to both the third splitter 210*c* along the first branch B1 and the fourth splitter 210*d* along the second branch B2; a step 1210 of conveying the signal from the second splitter 210*b* to both the third splitter 210*c* along the third branch B3 and to the fourth splitter 210*d* along the fourth branch B4; a step 1212 of conveying the signal from the third splitter 210*c* to the first output port P1 along the fifth branch B5 and to the second output port P2 along the sixth branch B6; and a step 1214 of conveying the signal from the fourth splitter 210*d* to the third output port P3 along the seventh branch B7 and to the fourth output port P4 along the eighth branch B8. The method 1200 has a step 1216 of shifting the phase of one downstream branch relative to the other downstream branch for each of the third and fourth splitters 210*c*, 210*d* in a manner to impart unique phase combinations at each one of the four output ports P1, P2, P3 and P4 and a step of 1218 of crossing-over the signal between at least two of the branches. The direction of arrival of the radio signal in the plane of detection is determined, at step 1220, based on the signals received from the first, second, third and fourth output ports P1, P2, P3 and P4.

The embodiments of the devices, systems and methods described herein may be implemented in a combination of both hardware and software. These embodiments may be implemented with programmable computers, each such computer including at least one processor, a data storage system (including volatile memory or non-volatile memory or other data storage elements or a combination thereof), and at least one communication interface.

Program code may be applied to input data to perform the functions described herein and to generate output information. The output information may be applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The term "connected" or "coupled to" may include both direct coupling (in which two elements that are coupled to each other contact each other) and indirect coupling (in which at least one additional element is located between the two elements).

The embodiments described herein are implemented by physical computer hardware. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, or other hardware components.

For simplicity only one computer is shown but systems may include one or more computers operable by users to access remote network resources. The computers may be the same or different types of devices. The computers may be connected in various ways including directly coupled, indirectly coupled via a network, and distributed over a wide geographic area and connected via a network (which may be referred to as "cloud computing"). For example, and without limitation, the computer may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein Computers can include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computers may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computers can include one or more input devices, such as a keyboard, mouse, camera, touch screen and a microphone, and may also include one or more output devices such as a display screen and a speaker. Computers can have a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. For instance, the waveguide structure can be provided in the form of an integral metal waveguide structure. Alternate embodiments can have more branches, input ports, splitters, or output ports than those referred to above. As understood from the above, the connection between the antennas and the corresponding splitters can be of the same length, or of different lengths such as if the different lengths are compensated by appropriate phase compensation. It will be understood that end fire type antennas, integrated antennas, or other antennas can be used. Diodes and switches can be integrated in a planar manner, or differently, if desired. The scope is indicated by the appended claims.

What is claimed is:

1. A waveguide structure having a two-dimensional layout and having first and second ends, comprising:
   a first input port for receiving a first input signal, the first input port located at the first end;
   a second input port for receiving a second input signal, the second input port located at the first end adjacent to the first input port and spaced a predetermined distance therefrom;
   first, second, third, and fourth output ports for providing first, second, third, and fourth output signals, respectively, the first, second, third, and fourth output ports located at the second end and each being adjacent to at least one other of the first, second, third, and fourth output ports; and
   a plurality of circuit elements located between the first and second ends and defining a plurality of branches connecting the circuit elements to each other, the branches defining a plurality of paths from the first and second input ports to the first, second, third and fourth output ports, the plurality of circuit elements comprising a plurality of splitters configured for producing the first, second, third, and fourth output signals based on the first and second input signals, the plurality of splitters comprising at least one power divider having a single input port and two output ports and configured to divide at least one of the first input signal and the second input signal into two intermediate signals, wherein each of the branches is connected to at least one of the plurality of splitters, and each of the plurality of paths comprises two of the plurality of splitters and at least one cross-over junction, and wherein at least two of the plurality of paths comprise the at least one power divider.

2. The waveguide structure of claim 1, wherein the first and second input ports, the first, second, third, and fourth output ports, and the circuit elements are provided in the form of a substrate-integrated waveguide.

3. The waveguide structure of claim 1, wherein the plurality of splitters implement a phase shifting system.

4. The waveguide structure of claim 3, wherein the at least one power divider comprises a first power divider configured to divide the first input signal into two first intermediate signals and a second power divider configured to divide the second input signal into two second intermediate signals.

5. The waveguide structure of claim 3, wherein the plurality of splitters comprises at least one directional coupler, the at least one directional coupler configured for imparting a 90° phase shift.

6. The waveguide structure of claim 1, wherein the two-dimensional layout of the waveguide structure has a rectangular shape.

7. The waveguide structure of claim 1, wherein the at least one cross-over junction comprises two cross-over junctions, each of the two cross-over junctions being formed between a corresponding pair of the plurality of branches.

8. The waveguide structure of claim 7, wherein the cross-over junctions are 0 dB couplers.

9. A direction-of-arrival (DoA) determination system, comprising:

a first antenna and a second antenna, the first and second antennas spaced apart by a first predetermined distance and configured for each receiving an incoming signal;

a waveguide structure having a two-dimensional layout and first and second ends, comprising:
  a first input port connected to the first antenna for receiving a first input signal based on the incoming signal, the first input port located at the first end;
  a second input port connected to the second antenna for receiving a second input signal based on the incoming signal, the second input port located at the first end adjacent to the first input port and spaced a second predetermined distance therefrom;
  first, second, third, and fourth output ports for providing first, second, third, and fourth output signals, respectively, the first, second, third, and fourth output ports located at the second end and each being adjacent to at least one other of the first, second, third, and fourth output ports; and
  a plurality of circuit elements located between the first and second ends and defining a plurality of branches connecting the circuit elements to each other, the branches defining a plurality of paths from the first and second input ports to the first, second, third and fourth output ports, the plurality of circuit elements comprising a plurality of splitters configured for producing the first, second, third, and fourth output signals based on the first and second input signals, the plurality of splitters comprising at least one power divider having a single input port and two output ports and configured to divide at least one of the first input signal and the second input signal into two intermediate signals, wherein each of the branches is connected to at least one of the plurality of splitters, and each of the plurality of paths comprises two of the plurality of splitters and at least one cross-over junction, and wherein at least two of the plurality of paths comprise the at least one power divider; and
at least one electronic component coupled to the first, second, third, and fourth output ports for receiving the first, second, third, and fourth output signals and configured for determining a direction of arrival of the incoming signal based on the first, second, third, and fourth output signals.

10. The DoA determination system of claim 9, wherein the first and second input ports, the first, second, third, and fourth output ports, and the circuit elements are provided in the form of a substrate-integrated waveguide.

11. The DoA determination system of claim 9, wherein the plurality of splitters implement a phase shifting system.

12. The DoA determination system of claim 11, wherein the at least one power divider comprises a first power divider configured to divide the first input signal into two first intermediate signals and a second power divider configured to divide the second input signal into two second intermediate signals.

13. The DoA determination system of claim 12, wherein the plurality of splitters comprises at least one directional coupler, the at least one directional coupler configured for imparting a 90° phase shift.

14. The DoA determination system of claim 9, wherein the first predetermined distance is less than half of a wavelength of the incoming signal.

15. The DoA determination system of claim 9, further comprising:

at least one third antenna positioned in alignment with the first antenna and the second antenna, and spaced from the second antenna by a third predetermined distance, the third predetermined distance being a prime multiple of the first predetermined distance; and
a switch operable to selectively connect the first antenna and the third antenna to the first input port.

16. The DoA determination system of claim 9, wherein the first and second antenna are spaced apart by the first predetermined distance in a first plane of detection, further comprising:
  a third antenna and a fourth antenna, the third and fourth antennas spaced apart by a third predetermined distance in a second plane of detection normal to the first plane of detection;
  a first switch operable to selectively connect the first antenna and the third antenna to the first nput port; and
  a second switch operable to selectively connect the second antenna and the fourth antenna to the second input port.

17. The DoA determination system of claim 9, wherein the waveguide structure is a first waveguide structure, wherein the first and second antenna are spaced apart by the first predetermined distance in a first plane of detection, further comprising:
  a third antenna and a fourth antenna, the third and fourth antennas spaced apart by a third predetermined distance in a second plane of detection normal to the first plane of detection; and
  a second waveguide structure having third and fourth input ports and a plurality of output ports, the third input port being connected to the third antenna, the fourth input port being connected to the fourth antenna, and the plurality of output ports being connected to the at least one electronic component;
  wherein the least one electronic component is further configured for determining the direction of arrival of the incoming signal based on the plurality of output signals.

18. A method of determining a direction of arrival of an incoming signal, comprising:
  obtaining, at first and second input ports of a waveguide structure having first and second ends, first and second input signals based on the incoming signal, the first and second input ports being adjacent, located at the first end, and spaced a predetermined distance from one another, the waveguide structure further comprising first, second, third, and fourth output ports being adjacent and located at the second end, and a plurality of circuit elements comprising a plurality of splitters, the plurality of circuit elements located between the first and second ends and defining a plurality of branches connecting the circuit elements to each other, the branches defining a plurality of paths from the first and second input ports to the first, second, third and fourth output ports, the plurality of splitters comprising at least one power divider having a single input port and two output ports and configured to divide at least one of the first and second input signals into two intermediate signals, wherein each of the branches is connected to at least one of the plurality of splitters, and each of the plurality of paths comprises two of the plurality of splitters and at least one cross-over junction, and wherein at least two of the plurality of paths comprise the at least one power divider;
  transmitting the first and second input signals from the first and second input ports to the first, second, third, and fourth output ports via the plurality of branches to produce first, second, third, and fourth output signals based on the first and second input signals, each of the first, second, third, and fourth output signals having a combination of a phase of the first input signal and a phase of the second input signal caused by the plurality of splitters;

outputting, at the first, second, third, and fourth output ports, the first, second, third, and fourth output signals, respectively; and determining, based on the first, second, third, and fourth output signals, a direction of arrival of the incoming signal.

19. The method of claim 18, further comprising:

receiving the incoming signal at a first antenna and a second antenna connected to the first and second input ports, respectively, the first and second antennas being spaced apart in a first detection plane; and routing the incoming signal to the first and second input ports.

20. The method of claim 19, further comprising:

receiving the incoming signal at a third antenna and a fourth antenna, the third and fourth antennas being spaced apart in a second detection plane;

routing the incoming signal to the first and second input ports;

repeating the obtaining and transmitting with third and fourth input signals based on the incoming signal received from the third and fourth antennas to produce fifth, sixth, seventh, and eighth output signals;

outputting, at the first, second, third, and fourth output ports, the fifth, sixth, seventh, and eighth output signals, respectively; and determining, based on the fifth, sixth, seventh, and eighth output signals, an elevation angle direction of arrival of the incoming signal.

* * * * *